(12) United States Patent
Bryne (10) Patent No.: US 6,494,117 B1
(45) Date of Patent: Dec. 17, 2002

(54) PEDAL/CLEAT ASSEMBLY (75) Inventor: Richard M. Bryne, Del Mar, CA (US)

(73) Assignee: Speedplay, Inc., San Diego, CA (US)

( * ) Notice: Subject to any disclaimer, the term of this patent is extended or adjusted under 35 U.S.C. 154(b) by 21 days.

(21) Appl. No.: 09/905,603

(22) Filed: Jul. 13, 2001

(51) Int. Cl.[7] .................................................. G05G 1/14
(52) U.S. Cl. ....................................... 74/594.6; 36/132
(58) Field of Search ........................... 74/594.4, 594.6; 36/131, 132

(56) References Cited

U.S. PATENT DOCUMENTS

| | | | |
|---|---|---|---|
| 4,298,210 A | 11/1981 | Lotteau et al. | 74/594.6 |
| 4,803,894 A | 2/1989 | Howell | 74/594.6 |
| 4,815,333 A | 3/1989 | Sampson | 74/594.6 |
| 4,819,504 A | 4/1989 | Sampson | 74/594.4 |
| 4,827,633 A | 5/1989 | Feldstein | 36/131 |
| 4,898,063 A | 2/1990 | Sampson | 74/594.6 |
| 4,899,618 A * | 2/1990 | Christol | 36/131 |
| 4,936,164 A | 6/1990 | Forke | 74/594.6 |
| 4,942,778 A | 7/1990 | Bryne | 74/594.6 |
| 5,199,324 A * | 4/1993 | Sain | 36/131 |
| 5,213,009 A | 5/1993 | Bryne | 74/594.6 |
| 5,284,066 A | 2/1994 | Weiss | 74/594.6 |
| 5,325,738 A | 7/1994 | Bryne | 74/594.6 |
| 5,546,829 A | 8/1996 | Bryne | 74/594.6 |
| 5,553,516 A | 9/1996 | Weiss | 74/594.6 |
| 5,575,184 A * | 11/1996 | De Schrijver | 74/594.6 |
| 5,606,894 A | 3/1997 | Bryne | 74/594.6 |
| 5,687,619 A | 11/1997 | Bryne | 74/594.6 |
| 5,852,955 A | 12/1998 | Crisick et al. | 74/594.6 |
| 5,862,716 A | 1/1999 | Bryne | 74/594.6 |

FOREIGN PATENT DOCUMENTS

| | | | | |
|---|---|---|---|---|
| DE | 3315282 A1 | 10/1984 | ............ | B62M/3/08 |
| DE | 34 26 103.6 | 1/1986 | | |
| EP | 0012097 | * 6/1980 | ............ | B62M/3/08 |
| FR | 0 015 803 | 2/1980 | ............ | B62M/3/08 |
| FR | 2 518 041 | 12/1982 | ............ | B62M/3/08 |
| FR | 2 609 270 | 7/1988 | ............ | B62M/3/08 |
| FR | 2 279 607 | 7/1994 | ............ | B62M/1/02 |

* cited by examiner

Primary Examiner—David A. Bucci
Assistant Examiner—Vicky Johnson
(74) Attorney, Agent, or Firm—Sheppard, Mullin, Richter & Hampton LLP; James R. Brueggemann (57) ABSTRACT

A clipless pedal/cleat assembly is disclosed, having a float range that is easily and precisely adjusted. The assembly includes a pedal body and a cleat body configured to conformably mate together, and it further includes two spaced-apart engagement recesses mounted on one of the two bodies, preferably the pedal body, and a tongue assembly mounted on the other of the two bodies, thus preferably the cleat body. The tongue assembly is configured for limited rotation relative to the body on which it is mounted, about a rotation axis generally normal to the sole of the rider's shoe when the pedal body and the cleat body are mated together. The tongue assembly includes two spring-biased tongues configured for selective engagement with the two engagement recesses. When the two tongues of the tongue assembly are engaged with the two engagement recesses, the tongue assembly is rotationally locked relative to the engagement recesses, such that rotation of the cleat body relative to the pedal body, about an axis normal to the sole of the rider's shoe, causes the tongue assembly to rotate relative to the particular body on which it is mounted, until a stop surface of the tongue assembly inhibits further relative rotation. Further rotation of the cleat body relative to the pedal body urges the tongues out of engagement with the engagement recesses, to release the cleat from the pedal.

23 Claims, 8 Drawing Sheets

PEDAL/CLEAT ASSEMBLY

BACKGROUND OF THE INVENTION

This invention relates generally to pedals for use on bicycles and the like, and, more particularly, to clipless pedal/cleat assemblies in which a cleat attached to the sole of a rider's shoe can be releasably secured to a pedal.

Pedals for use in pedal/cleat assemblies of this particular kind typically include a pedal body, a spindle mounted for rotation relative to the pedal body, and separate pairs of spaced-apart engagement edges, e.g., recesses, located on the pedal body's upper side and lower side. The cleats for releasable securement to such pedals typically each include a cleat body configured to mate with either side of the pedal body, and further include a pair of spring-biased elements, e.g., tongues, that can selectively engage one pair of spaced-apart engagement edges on the pedal, to releasably secure the cleat to the pedal.

The rider can release the cleat and shoe from the pedal simply by rotating the shoe through a predetermined angle about an axis normal to the shoe's sole. This rotation urges the cleat's spring-biased elements apart from each other, eventually leading to a release of the cleat and shoe.

Many pedal/cleat assemblies of this kind provide a "float range," which is an amount of angular rotation that the rider's shoe can have without disengaging the cleat from the pedal. This reduces restrictions on the natural rotation of the rider's leg during pedaling, and thus reduces the possibility of injury. Prior pedal systems of this kind typically provided float ranges as high as ±7.5°.

In the past, the float ranges of pedal/cleat assemblies typically have been fixed, but in some cases could be adjusted. In general, however, provisions for adjusting the float range have not been entirely satisfactory. In some cases, the adjustments could be made only in large increments, while in other cases, the adjustments have been difficult to perform.

It should, therefore, be appreciated that there is a continuing need for an improved pedal/cleat assembly in which the assembly provides a float range that is easily and precisely adjusted. The present invention fulfills this need.

SUMMARY OF THE INVENTION

The present invention is embodied in a pedal/cleat assembly that provides a float range that is easily and precisely adjusted. The assembly includes a pedal having a pedal body and a spindle mounted for rotation relative to the pedal body, and it further includes a cleat having a cleat body configured to be secured to the sole of a rider's shoe and to conformably mate with the pedal body. Either the pedal or the cleat further includes one or more engagement edges, e.g., recesses, and the other of the pedal and cleat further includes one or more spring-biased elements, e.g., tongues, mounted in positions to be engageable with the one or more engagement edges. Either the one or more engagement edges or the one or more spring-biased elements are configured for limited rotation relative to the body on which they are mounted, about a rotation axis generally normal to the sole of the rider's shoe when the pedal body and the cleat body are mated together.

The pedal and the cleat are configured such that, when the one or more spring-biased elements are engaged with the one or more engagement edges, the elements and edges are rotationally locked relative to each other. Rotation of the cleat body relative to the pedal body, thereby causes the elements and edges to rotate together, until a stop surface inhibits such rotation together. The one or more spring-biased elements and the one or more engagement edges are configured such that further rotation of the cleat body relative to the pedal body urges the elements out of engagement with the engagement edges, to release the cleat from the pedal.

In one preferred form of the invention, the one or more spring-biased elements are tongues that are part of a tongue assembly that is rotatably mounted on the cleat body, and the one or more engagement edges are recesses that are defined in the pedal body. When the tongues of the tongue assembly are engaged with the engagement recesses, the tongue assembly is rotationally locked relative to the engagement recesses, such that rotation of the cleat body relative to the pedal body, about an axis normal to the sole of the rider's shoe, causes the cleat body to rotate relative to the tongue assembly. This relative rotation continues until a stop surface of the tongue assembly engages a stop surface of the cleat body, to inhibit further relative rotation.

In more detailed features of the invention, the tongue assembly is a unitary, arcuate spring clip, with two spaced-apart arms that carry two tongues in spaced, facing relationship with each other. Continued rotation of the cleat body relative to the pedal body, after the stop surfaces of the cleat body and the spring clip have engaged each other, urges the tongues of the spring clip apart from each other, to release the cleat from the pedal.

In another feature of the invention, the spring clip includes a finger that projects radially outward from its mid-portion, to define the first of the two stop surfaces, and the cleat body includes a recess sized to receive the finger of the spring clip, the recess being bounded by a wall that defines the second of the two stop surfaces. A pair of adjustable set screws can be used to define the sidewalls of the recess that receives the finger of the spring clip. The positions of these set screws are selectively adjustable, to facilitate a selection of the angle through which the cleat can be rotated relative to the pedal body before the stop surfaces of the cleat body and the spring clip engage each other and thereby inhibit further rotation of the cleat body relative to the spring clip. Preferably, the finger is integral with the spring clip.

In another feature of the invention, the cleat further includes a friction device located between the cleat body and the spring clip, to frictionally inhibit rotational movement of the cleat body relative to the spring clip. Further, the spring clip has a shape substantially corresponding to a circular arc, and it is rotatable relative to the cleat body, about an axis substantially aligned with the geometric center point of the circular arc.

In yet other features of the invention, the engagement recesses and the tongues each include side edges that define cam surfaces configured to urge each tongue out of engagement with the corresponding engagement recess, to release the cleat from the pedal. Further, the cam surfaces defined by each of the engagement recesses are located at the recess's opposite ends, and the cam surfaces defined by each of the tongues are located at the tongue's opposite ends, engageable with the cam surfaces defined by the corresponding engagement recess. The angles of the cam surfaces relative to a radius to the axis of rotation of the cleat body relative to the pedal body, together with the spring bias force provided by the tongue assembly, determine the force required to disengage the cleat from the pedal. The angles for a heel-out release can differ from the angles for a heel-in release.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENTS

Figure 1:
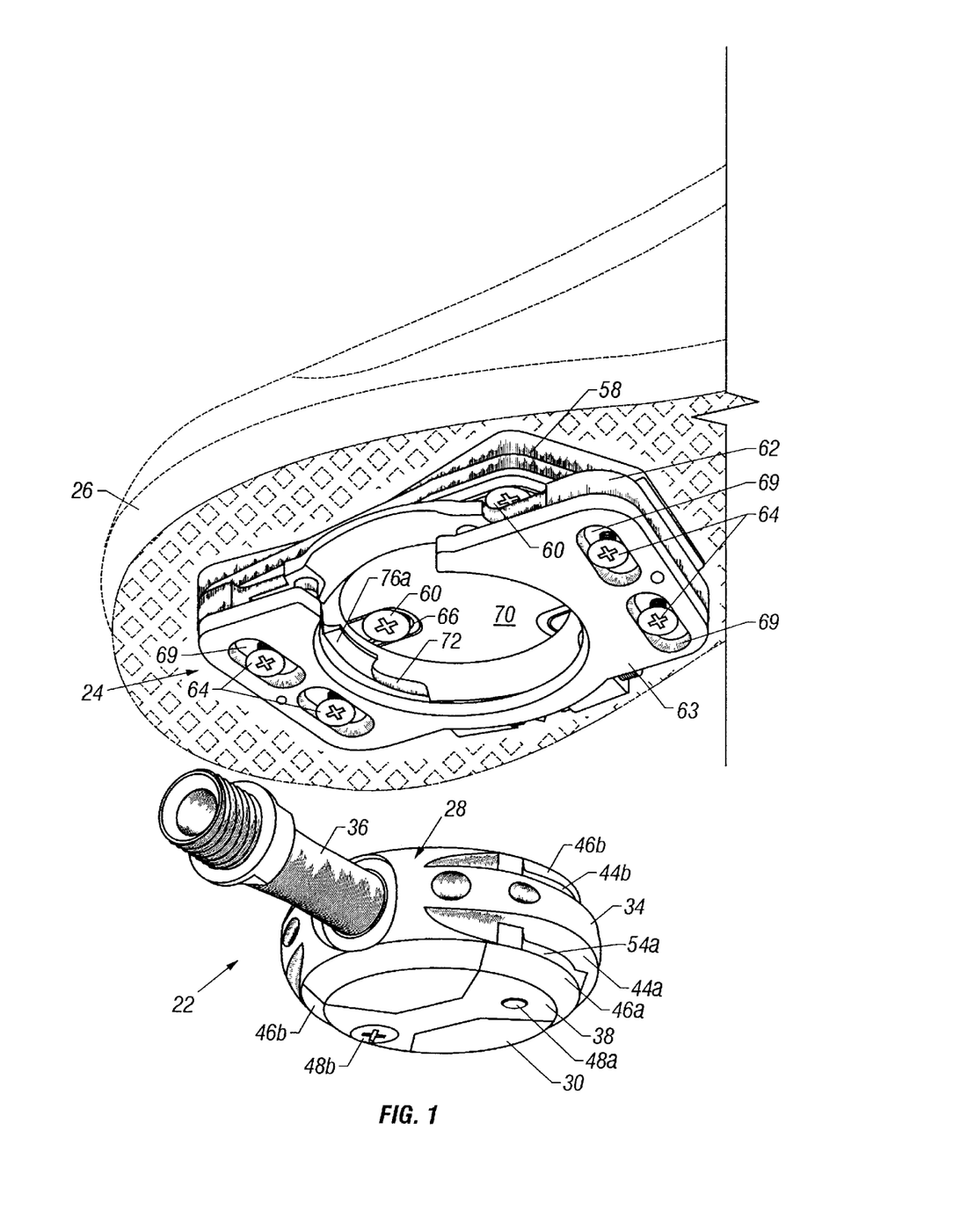
FIG. 1 is a bottom perspective view of a cleat secured to the sole of a rider's shoe, positioned above a bicycle pedal, the cleat and pedal constructed in accordance with one preferred embodiment of the invention.
Figure 2:
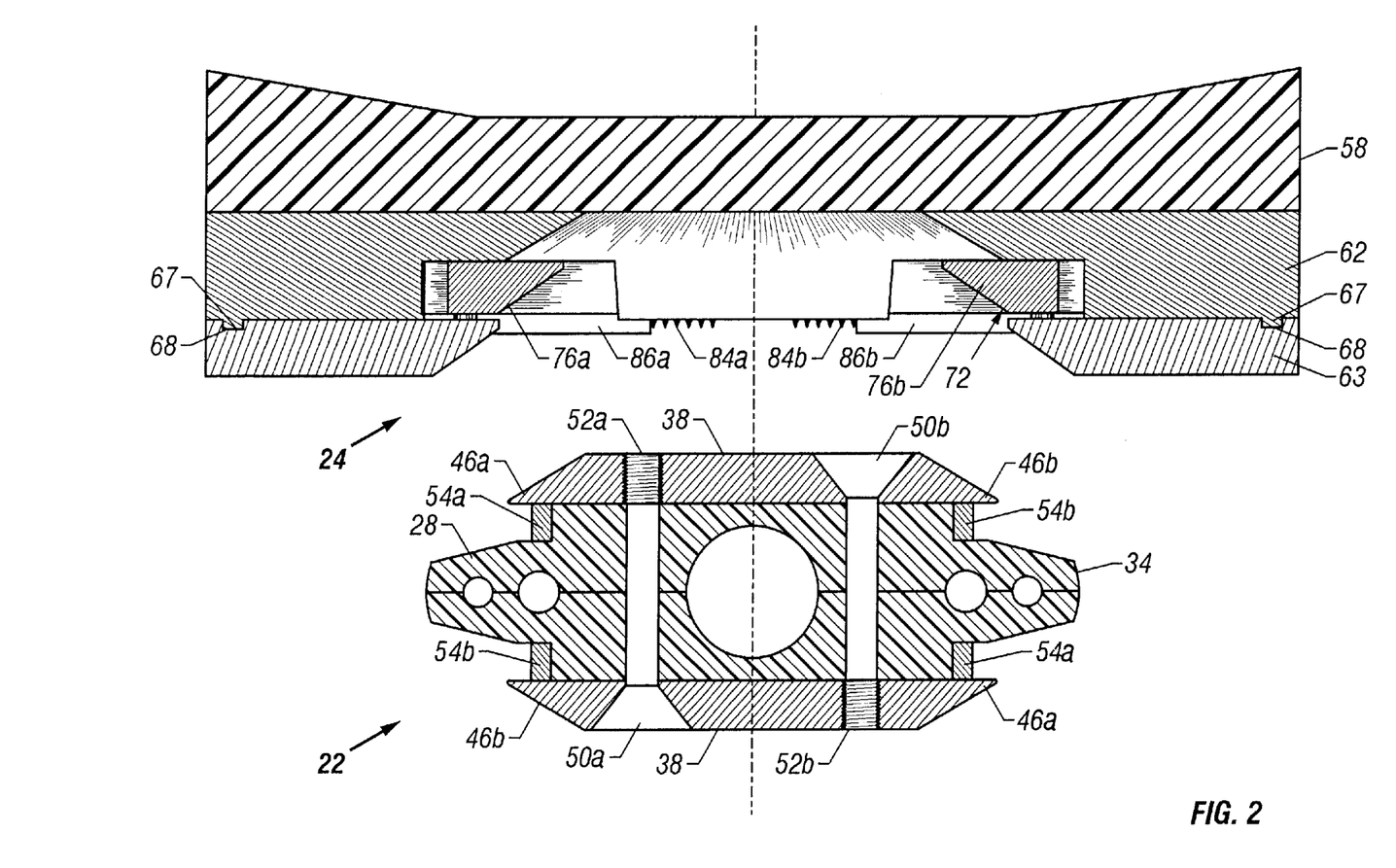
FIG. 2 is a cross-sectional view of the cleat and pedal of FIG. 1, with the cleat being shown in position above the pedal.
Figure 3:
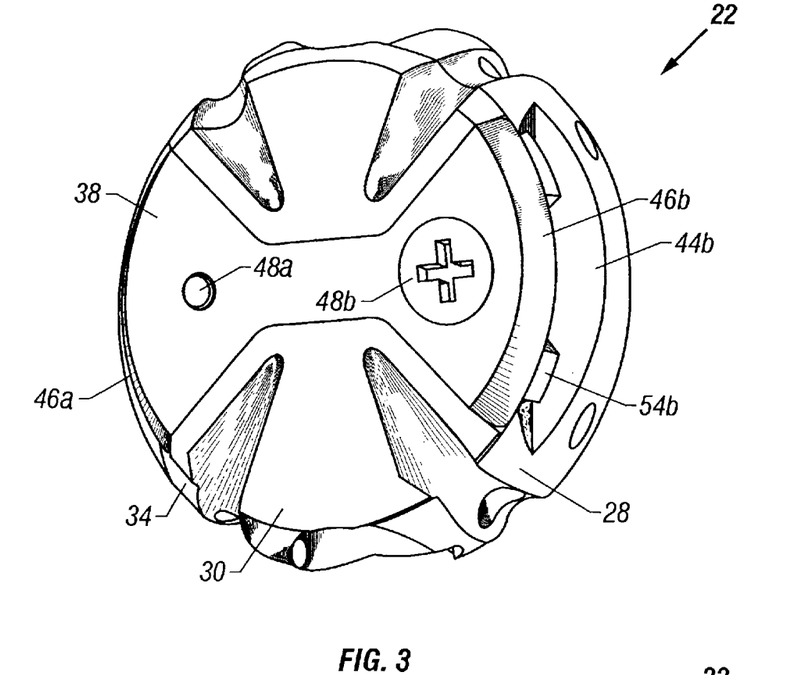
FIG. 3 is a top perspective view of the pedal of FIG. 1.
Figure 4:
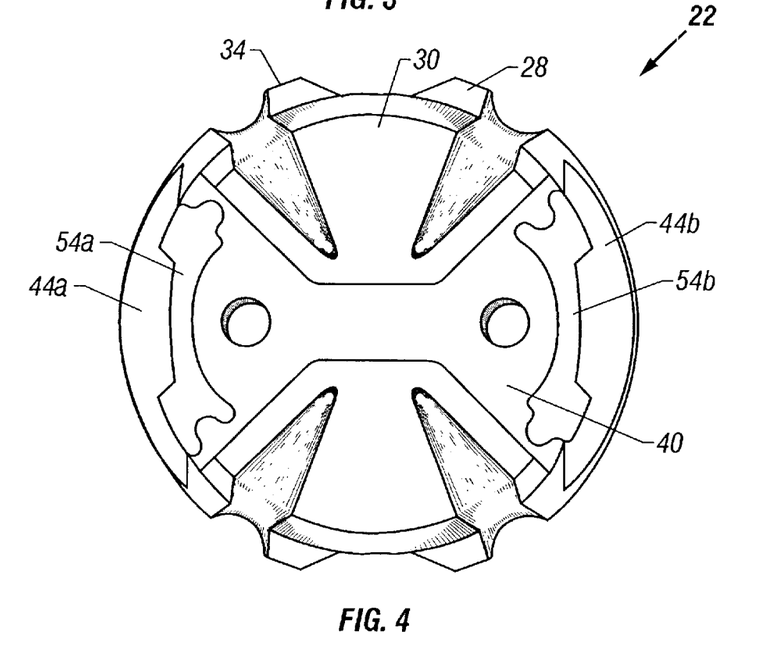
FIG. 4 is a top plan view of the pedal of FIG. 1, shown with the upper planar insert removed, to reveal the two cam inserts.
Figure 5:
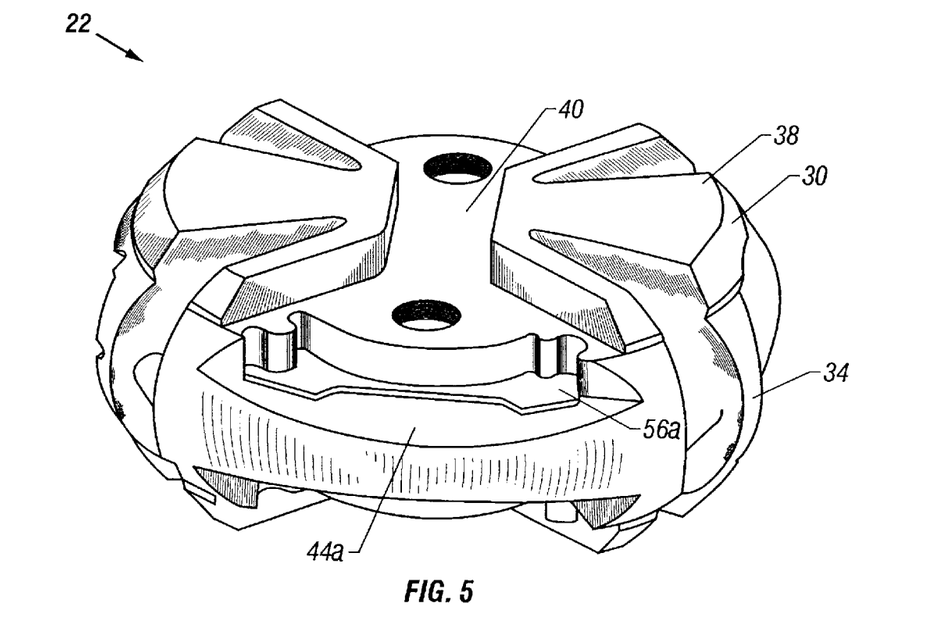
FIG. 5 is a top perspective of the pedal of FIG. 1, rotated 90° from the view of FIG. 3, shown with the upper planar insert and the two cam inserts removed.
Figure 6:
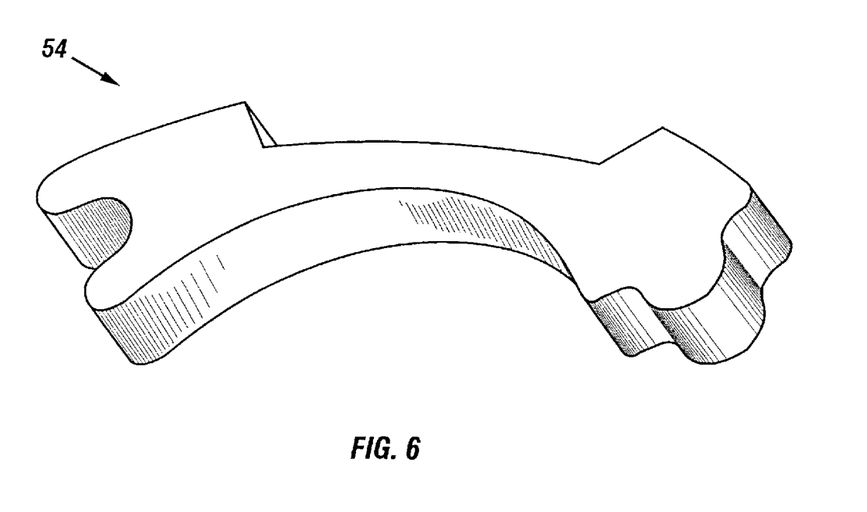
FIG. 6 is an enlarged perspective view of one of the cam inserts of the pedal of FIG. 1.

With reference now to the drawings, and particularly to FIGS. 1–2, there is shown a bicycle pedal/cleat assembly that includes a pedal 22 and a cleat 24 attached to the sole of a rider's shoe 26, for releasable attachment to the pedal. The pedal is generally disk-shaped and symmetrical along a bisecting plane, defining an upper side and an identical lower side. This configuration enables the cleat to be releasably attached to whichever side of the pedal (upper or lower) is most conveniently oriented. Only a right-side pedal is shown in the drawings and discussed below, although it will be understood that a similar, mirror-image pedal can be located on the bicycle's left side.

With particular reference to FIGS. 1–6, the pedal 22 includes a two-part disk-shaped pedal body 28 having an upper planar surface 30, an identical lower planar surface 30, and an annular peripheral surface 34. A spindle 36 extends diametrically through the pedal body, for attachment to a pedal crank (not shown). A planar, bow-tie-shaped insert 38 is located within an identically shaped shallow recess 40 (FIGS. 4 and 5) formed in the pedal body's upper planar surface. The insert extends diametrically across the entire upper surface, along an axis perpendicular to the axis of the spindle. The insert's upper surface is coplanar with the pedal body's upper surface. A similar planar insert 38 (FIG. 1) is located within a recess formed in the pedal body's lower planar surface.

Engagement edges in the form of recesses 44a and 44b are defined in the pedal body, beneath the opposite ends 46a and 46b of the planar insert 30. As will be described below, these recesses are sized and configured to be engaged by portions of the cleat 24, to releasably secure the cleat to the pedal 22.

The pedal body 28 is formed from two identical halves. The upper and lower planar inserts 38 are secured to the pedal body's upper and lower surfaces 30 by a pair of screws 48a and 48b extending completely through the pedal body. The head of the screw 48a is seated in a countersunk hole 50a formed in the upper planar insert, and the threaded shank of the screw 48a extends through the pedal body to engage a threaded hole 52a formed in the lower planar insert 30. Similarly, the head of the screw 48b is seated in a countersunk hole 50a formed in the lower planar insert, and the threaded shank of the screw 48b extends through the pedal body to engage a threaded hole 52b formed in the upper planar insert.

Cam inserts 54a and 54b are located beneath the respective opposite ends 46a and 46b of the planar insert 30. Specifically, these cam inserts are located in similarly shaped recesses 56a and 56b formed adjacent to the respective engagement recesses 44a and 44b. The cam inserts are confined within these similarly shaped recesses by the securement of the overlaying planar inserts. As will be described below, the cam inserts function to cooperate with portions of the cleat 24 to facilitate a convenient release of the cleat from the pedal 22.

The two-part pedal body 28 is formed of a suitable high-strength, engineering-grade plastic material such as high-strength nylon. The upper and lower planar inserts 30, and the cam inserts 54a and 54b are formed of suitable high-strength metals.

With particular reference now to FIGS. 1 and 7–11, the cleat 24 includes an upper body or plate 58 secured by screws 60 to the sole of the rider's shoe 26, and a lower body or plate 62 and a cover plate 63 secured by screws 64 to the upper plate. The screws for attaching the upper plate to the shoe sole extend through three oblong holes 66 formed in the upper plate, which are oriented longitudinally relative to the sole's longitudinal axis. This allows for a precise adjustment of the plate's fore and aft, or longitudinal, location on the sole. The lower plate and the cover plate incorporate interlocking tabs 67 and recesses 68 (FIG. 2), and the screws for attaching these two plates to the upper plate extend through four oblong holes 69 that are oriented laterally relative to the sole's longitudinal axis. This allows for a precise adjustment of the lower plate's side-to-side, or lateral, location on the sole. The screws are received in threaded inserts (not shown in the drawings) embedded within the upper plate.

Central portions of the cleat's lower plate 62 and interlocked cover plate define a circular seat 70 sized and configured to conformably receive the upper (or lower) surface 30 of the pedal body 28. Encircling this seat is a spring clip 72 having an arcuate shape that follows the circular seat's periphery. A gap is defined in the spring clip on the inboard side of the cleat 24, i.e., the side of the cleat facing the pedal crank, such that the spring clip further defines forward and rearward arcuate arms 74a and 74b. The radially inward sides of these arms carry tongues 76a and 76b, which are sized and positioned to engage the respective engagement recesses 44a and 44b defined beneath the planar insert 30 of the pedal, to releasably secure the cleat to the pedal.

Figure 7:
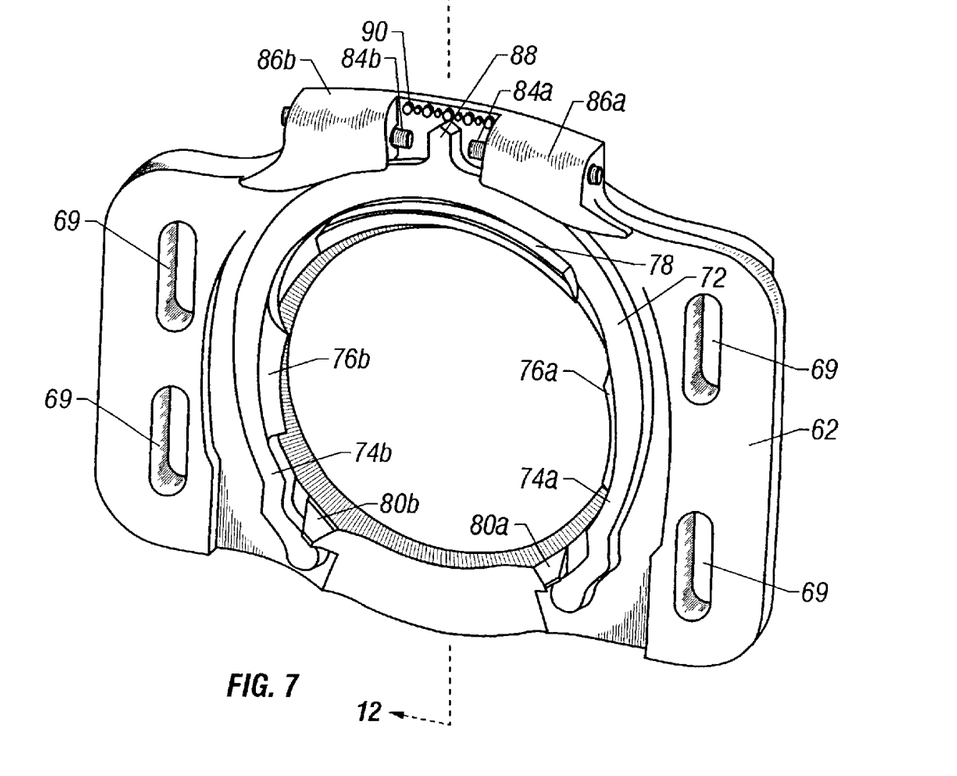
FIG. 7 is a bottom perspective view of the cleat of FIG. 1.
Figure 8:
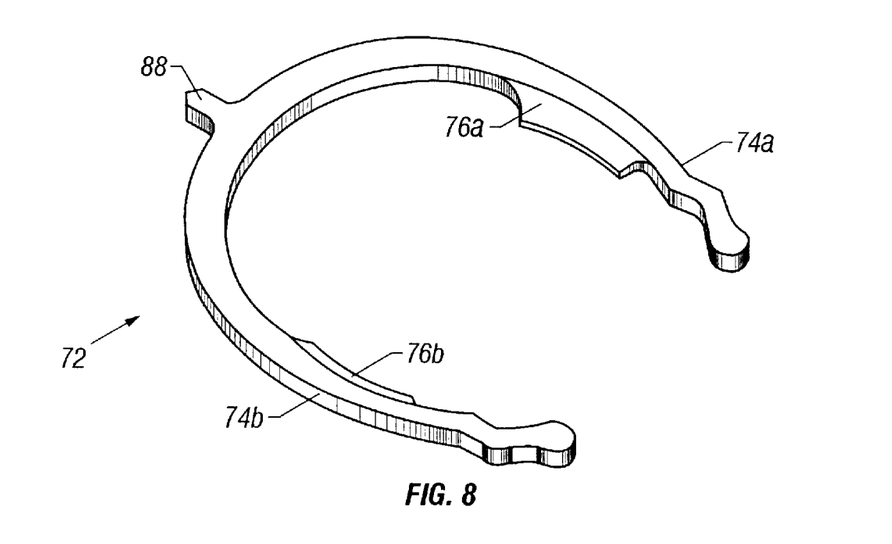
FIG. 8 is a perspective view of the spring clip portion of the cleat of FIG. 7.

The spring clip 72 is held in the position depicted in FIG. 7 by its own spring tension, urging it inwardly against an upstanding arcuate wall 78 and forward and rearward stops 80a and 80b, respectively, located immediately adjacent to the circular seat 70. The forward and rearward stops also function to position the spring clip's forward and rearward arcuate arms 74a and 74b, and their tongues 76a and 76b, in their prescribed positions to engage and retain the pedal 22. The radially inward-facing sides of the upstanding wall 78 and of the stops 80a and 80b are beveled, to facilitate alignment of the cleat 24 with the pedal when the cleat is being secured to the pedal. The cover plate 63 holds the spring clip against the lower plate's lower surface, to prevent it from falling off during use.

The radially inward-facing sides of the tongues 76a and 76b are beveled, to match corresponding bevels 82a and 82b at the forward and rearward ends of the pedal's planar insert 30. This facilitates an alignment of the cleat 24 with the pedal 22, when the cleat is being secured to the pedal. It also allows the securement to be accomplished simply by forcing the cleat downwardly onto the pedal. Specifically, forcing the cleat downwardly causes one or both of the pedal bevels to urge the corresponding arm (74a or 74b) of the spring clip 72 to flex radially outward to accommodate the pedal.

Typically, the rider secures the cleat 24 onto the pedal 22 by centering the cleat on the pedal and orienting the cleat so that one of the tongues 76a or 76b of the cleat's spring clip 72 is disposed within the corresponding engagement recess 44a or 44b of the pedal. The rider then forces the cleat downwardly against the pedal, causing the other of the two tongues to flex radially outward until the tongue enters its corresponding recess and the cleat is secured in place. After the cleat has been secured in this fashion, the rider can apply a driving force to the pedal throughout the entire pedal cycle.

Figure 9:
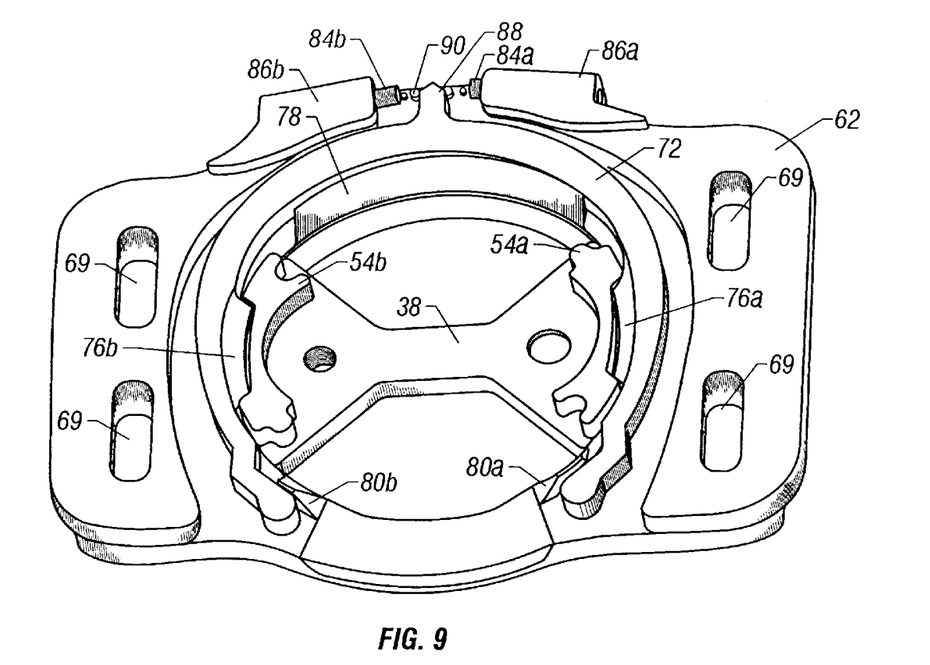
FIG. 9 is a bottom perspective view of the cleat of FIG. 7, shown with the cam insert and upper planar insert of the pedal in their positions locked to the cleat, with the cleat is in its nominal, centered position on the pedal, with the finger of the cleat's spring clip located midway between the cleat's forward and rearward set screw stops.
Figure 10:
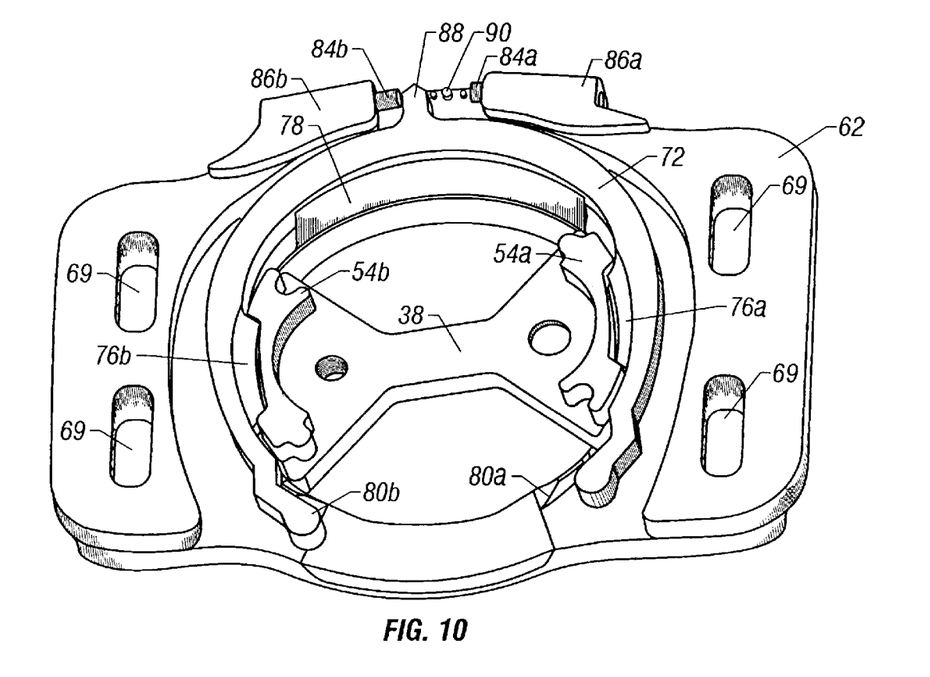
FIG. 10 is a bottom perspective view similar to FIG. 9, but with the cleat rotated to a position where the finger of the cleat's spring clip first engages the cleat's forward set screw stop.
Figure 11:
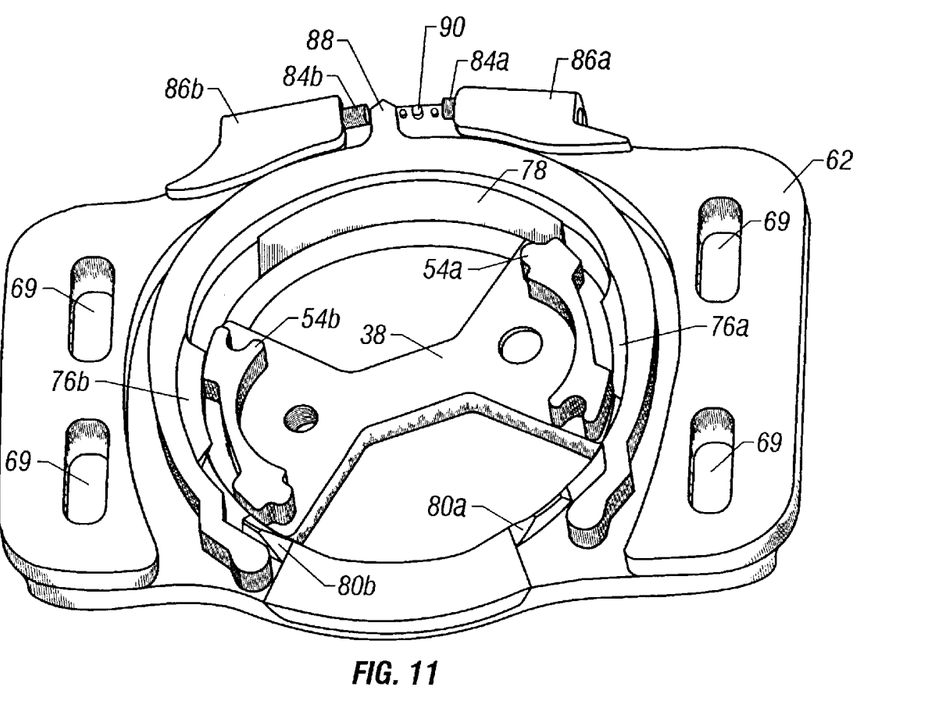
FIG. 11 is a bottom perspective view similar to FIG. 9, but with the cleat rotated to a position where the tongues of the cleat's spring clip release their grip on the pedal's upper planar insert.

When the cleat 24 is engaged with the pedal 22, the tongues 76a and 76b of the cleat's spring clip 72 are disposed within the pedal's respective engagement recesses 44a and 44b. This is best depicted in FIG. 9. In this position, the lateral edges of the tongues abut against the lateral edges of the cam inserts 54a and 54b. These abutting edges, or cam surfaces, are oriented at prescribed angles relative to a radial reference.

Disengagement of the cleat 24 from the pedal 22 can be accomplished by rotating the cleat in either a heel-in or a heel-out direction about an axis normal to the plane of the sole of the rider's shoe 26. Such rotation causes lateral edges of the cam inserts 54a and 54b to forceably engage the adjacent lateral edges of the tongues 76a and 76b. Eventually, because of the non-radial angle of these abutting edges, the tongues and thus their respective arms 74a and 74b are urged radially outward sufficiently to release the overhanging ends of the planar insert 30 and thereby release the pedal.

The angles of the lateral edges, or cam surfaces, of the cam inserts 54a and 54b, of course, affect the amount of torque that the rider must apply to the cleat 24 to disengage the cleat from the pedal 22. If desired, the cam inserts can be selected from a set of inserts providing cam surfaces having a range of cam angles. The angles of the cam surfaces at the opposite ends of each cam insert need not match each other. In addition, the angles of the cam surfaces at opposite ends of each tongue 76a or 76b need not match the angles of the mating cam insert.

In accordance with the invention, a desired amount of angular float is provided between the cleat 24 and the pedal 22 before the arms 74a and 74b of the cleat's spring clip 72 are urged radially outward a sufficient distance to release the cleat. This is accomplished by configuring the spring clip to remain rotationally fixed relative to the pedal, while the cleat plate 62 is rotated in either a heel-in or a heel-out direction relative to the spring clip and the pedal. After the cleat plate has rotated through a selected angle, however, further rotation of the cleat plate relative to the spring clip is prevented, and further rotation of the cleat plate causes the spring clip arms to be flexed outwardly, to release the cleat.

The amount of pedal float is controllably adjusted using forward and rearward set screws 84a and 84b that are carried within threaded bores formed in upstanding walls 86a and 86b. These upstanding walls are located radially outward of a mid-portion of the spring clip 72, on the portion of the cleat 24 intended to be disposed on the crank side of the pedal 22. An integral finger 88 projects radially outward from that mid-portion of the spring clip, into a space defined between the upstanding walls 86a and 86b. While the spring clip is rotationally fixed relative to the pedal, rotation of the cleat plate 62 thus causes one of the two set screws to move toward the finger and the other to move away from it. Eventually, continued rotation of the cleat plate will bring one of the set screws into contact with the finger, after which the spring clip will be made to rotate with the cleat plate.

The space defined between the upstanding walls 86a and 86b is sized to allow a float of up to about 7.5° in either rotational direction. A maximum float is provided by retracting the set screws 84a and 84b fully into their respective upstanding walls. On the other hand, a minimum float (i.e., zero float) is provided by extending the set screws fully into the space between the walls. Of course, any amount of float between zero and the maximum can be selected simply by adjustably positioning the set screws.

The position of the forward set screw 84a controls the amount of float provided in the heel-in direction, and the position of the rearward set screw 84b controls the amount of float provided in the heel-out direction. Suitable reference markings 90 (FIG. 7) are provided to indicate the amount of float that has been selected. It further will be appreciated that the heel-out float and the heel-in float can be adjusted independently of each other.

Figure 12:
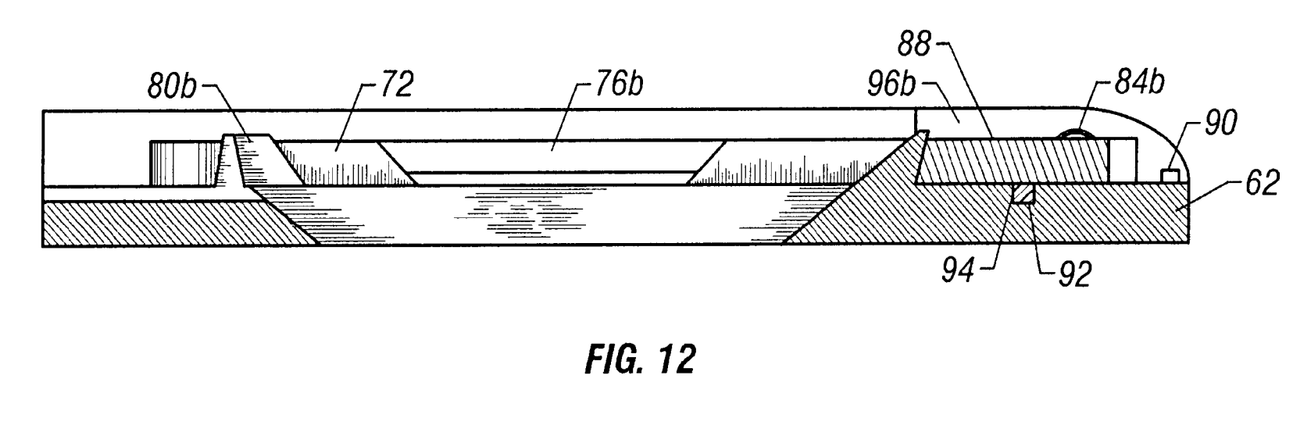
FIG. 12 is a cross-sectional view of the cleat, taken substantially in the direction of the arrows 12—12 in FIG. 7, showing a friction plug for a desired amount of frictional resistance to rotation of the spring clip relative to the cleat plate.

It will be appreciated that the structure described above provides only minimal resistance to rotational movement of the cleat plate 62 relative to the pedal 22, within the float range. Sometimes, however, the rider will desire to have a discernable resistance to such movement. Such resistance can be provided easily by positioning a friction plug 92 into a recess 94 formed in the cleat plate 62, beneath a mid-portion of the spring clip 72. This structure is depicted in FIG. 12. The friction plug can be formed of a compressible plastic material, and it can be sized such that it is compressed within the recess when the spring clip is installed onto the cleat plate. The size of the friction plug relative to the recess can be controlled to provide an amount of compression that will yield the desired frictional engagement between the spring clip and the cleat plate.

It further will be appreciated that pedal and cleat described above and shown in the drawings could be reconfigured such that either the pedal's periphery or the cleat's circular recess has a non-circular configuration, but in its place has a structure that is engageable and rotatable with the mating component. For example, the pedal could be reconfigured to have four spoke-like portions whose outer peripheries define working surfaces that cooperate to mate with a circular recess defined in the cleat. Two of those spoke-like portions could be constituted by a component configured like the planar, bow-tie shaped insert of the embodiment described above.

In other embodiments of the invention (not shown in the drawings), the spring clip could include tongues that project radially outwardly, rather than radially inwardly. In such an embodiment, the pedal is configured to include engagement recesses that face radially inwardly to receive the tongues, and the tongues are spring-biased outwardly into engagement with the recesses. This embodiment would function similarly to the embodiment described above, with the spring clip rotating with the pedal until a finger of the spring clip engages one of the set screw stops on the cleat, after which time further rotation of the cleat would cause the tongues of the spring clip to deflect radially inwardly until they disengage from the engagement recesses and release the cleat from the pedal.

In another alternative embodiment of the invention (not shown in the drawings), the spring clip and tongues are located on the pedal, and the engagement recesses are located on the pedal. Two such spring clips could be provided, one on each side of the pedal. This embodiment would function similarly to the embodiments described above, with the spring clip rotating with the cleat until a finger of the spring clip engages a stop on the pedal, after which time further rotation of the cleat would cause the tongues of the spring clip to deflect radially (outwardly or inwardly) away from the engagement recesses and release the cleat from the pedal.

In yet other embodiments of the invention (not shown in the drawings), the spring clip can include more than two tongues that are spring-biased into engagement with the mating engagement recesses. Further, the finger that engages the stops could be located at any suitable portion of the spring clip.

In yet other embodiments of the invention (not shown in the drawings), the pedal includes upper and lower bow-tie-shaped planar inserts that are rotatable relative to the pedal body, about an axis normal to the sole of the rider's shoe, when the cleat and pedal are engaged with each other. Rotation beyond selected angles in the two rotation directions is inhibited by stops mounted on the pedal. These stops can take the form of set screws. The engagement recesses can be defined by the pedal's planar recesses, and the tongues can be defined by the cleat. When the tongues are engaged with the engagement recesses, the planar inserts will rotate along with the cleat, until the rotation reaches one or the other of the prescribed angles, after which further rotation will cause the tongues to ramp out of the engagement recesses, to release the cleat from the pedal.

It should be appreciated from the foregoing description that the present invention provides an improved pedal/cleat assembly having a float range that is easily and precisely adjusted. The assembly includes a pedal body and a cleat body configured to conformably mate together, and it further includes one or more engagement edges, e.g., engagement recesses, mounted on one of the two bodies, preferably the pedal body, and a spring assembly mounted on the other of the two bodies, thus preferably the cleat body. The spring assembly is configured for limited rotation relative to the plate on which it is mounted, about a rotation axis generally normal to the sole of the rider's shoe when the pedal body and the cleat plate are mated together. The spring assembly includes one or more spring-biased elements, e.g., tongues, configured for selective engagement with the one or more engagement edges. When the one or more spring-biased elements are engaged with the one or more engagement edges, the spring assembly is rotationally locked relative to the engagement edges, such that rotation of the cleat body relative to the pedal body, about an axis normal to the sole of the rider's shoe, causes the spring assembly to rotate relative to the particular body on which it is mounted, until a stop surface inhibits further relative rotation. Further rotation of the cleat body relative to the pedal body urges the one or more spring-biased elements out of engagement with the engagement edges, to release the cleat from the pedal.

It will be appreciated that the invention has been described in detail with reference only to the presently preferred embodiment. Various modifications can be made without departing from the invention. Accordingly, the invention is defined only by the following claims.

I claim:

1. A pedal/cleat assembly comprising:
   a pedal including a pedal body and a spindle mounted for rotation relative to the pedal body; and
   a cleat including a cleat body configured to be secured to the sole of a rider's shoe and to conformably mate with the pedal body;
   wherein the pedal and the cleat, together, further include
      one or more engagement edges mounted on one of the pedal body and the cleat body, and
      a spring assembly mounted on the other of the pedal body and the cleat body, wherein the spring assembly is configured for limited rotation relative thereto, about a rotation axis generally normal to the sole of the rider's shoe when the pedal body and the cleat body are mated together, and wherein the spring assembly includes one or more spring-biased elements configured to be selectively engageable with the one or more engagement edges,
   wherein when the one or more spring-biased elements are engaged with the one or more engagement edges, the spring assembly is rotationally locked relative to the engagement edges, such that rotation of the cleat body relative to the pedal body, about an axis normal to the sole of the rider's shoe, causes the spring assembly to rotate relative to the one of the pedal body and the cleat body on which it is mounted, until a stop surface inhibits further relative rotation;
   and wherein the one or more spring-biased elements and the one or more engagement edges are configured such that further rotation of the cleat body relative to the pedal body urges the one or more spring-biased elements out of engagement with the one or more engagement edges, to release the cleat from the pedal.

2. A pedal/cleat assembly as defined in claim 1, wherein:
   the one or more engagement edges are mounted on the pedal body;
   the spring assembly is mounted on the cleat body; and
   when the one or more spring-biased elements of the spring clip are engaged with the one or more engagement edges, the spring assembly is rotationally locked relative to the pedal body, such that rotation of the cleat body relative to the pedal body, about an axis normal to the sole of the rider's shoe, causes the cleat body to rotate relative to spring assembly, until a stop surface of the cleat body engages a stop surface of the spring assembly, to inhibit further relative rotation.

3. A pedal/cleat assembly as defined in claim 2, wherein:
the spring assembly of the cleat is a unitary, arcuate spring clip having two spaced-apart arms;
the one or more spring-biased elements include two tongues carried on the two spaced-apart arms, in spaced, facing relationship with each other; and
continued rotation of the cleat body relative to the pedal body, after the stop surfaces of the cleat body and the spring clip have engaged each other, urges the two tongues of the spring clip apart from each other, to release the cleat from the pedal.

4. A pedal/cleat assembly as defined in claim 3, wherein:
the spring clip includes a finger that projects radially outward from a mid-portion thereof, to define one of the two stop surfaces; and
the cleat body includes a recess sized to receive the finger of the spring clip, the recess being bounded by a side wall that defines the other of the two stop surfaces.

5. A pedal/cleat assembly as defined in claim 4, wherein:
the cleat body further includes a pair of adjustable set screws that define sidewalls of the recess that receives the finger of the spring clip; and
the positions of the pair of adjustable set screws are selectively adjustable, to facilitate a selection of the angle through which the cleat can be rotated relative to the pedal body before the stop surfaces of the spring clip and the cleat body engage each other and thereby inhibit further rotation of the cleat body relative to the spring clip.

6. A pedal/cleat assembly as defined in claim 2, wherein the cleat further includes a friction device located between the pedal body and the spring assembly, to frictionally inhibit rotational movement of the cleat body relative to the spring assembly.

7. A pedal/cleat assembly as defined in claim 2, wherein:
the spring assembly is a unitary spring clip having a shape substantially corresponding to a circular arc, the circular arc having a geometric center point; and
the spring clip is rotatable relative to the cleat body, about an axis substantially aligned with the geometric center point of the circular arc.

8. A pedal/cleat assembly as defined in claim 1, wherein:
the one or more engagement edges each have the form of a recess having side edges defining recess cam surfaces;
the one or more spring-biased elements each have the form of a tongue having side edges that define tongue cam surfaces;
the recess cam surfaces and the tongue cam surfaces are configured such that rotation of the cleat relative to the pedal, after the stop surface has inhibited further rotation of the spring assembly relative to the body on which it is mounted, urges the one or more tongues out of engagement with the one or more engagement recesses, to release the cleat from the pedal.

9. A pedal/cleat assembly as defined in claim 8, wherein:
the recess cam surfaces are located at opposite ends of each of the one or more engagement recesses, the recess cam surfaces having prescribed angles relative to a radius from the axis of rotation of the cleat body relative to the pedal body; and
the tongue cam surfaces are located at opposite ends of each of the one or more tongues, engageable with the cam surfaces defined by the corresponding engagement recess, the tongue cam surfaces having prescribed angles relative to a radius from the axis of rotation of the cleat body relative to the pedal body.

10. A pedal/cleat assembly comprising:
a pedal including a pedal body, a spindle mounted for rotation relative to the pedal body, and two engagement edges mounted on the pedal body in spaced-apart relationship to each other; and
a cleat including
a cleat body configured to be secured to the sole of a rider's shoe and to conformably mate with the pedal body, and
a unitary, arcuate spring clip mounted on the cleat body, the spring clip having two spring-biased elements configured for selective engagement with the engagement edges of the pedal, wherein the spring clip is configured for limited rotation relative to the cleat body, about a rotation axis generally normal to the sole of the rider's shoe,
wherein the cleat body and the spring clip, together, include first and second stop surfaces that are engageable with each other to inhibit excessive relative rotation of the cleat body and the spring clip;
wherein when the two spring-biased elements of the spring clip have engaged the engagement edges of the pedal, the spring clip is rotationally locked relative to the pedal body such that rotation of the cleat body relative to the pedal body, about an axis normal to the sole of the rider's shoe, causes the cleat body to rotate relative to the spring clip, until the stop surfaces of the cleat body and the spring clip inhibit further relative rotation;
and wherein the two engagement edges of the pedal and the two spring-biased elements of the cleat are configured such that further rotation of the cleat body relative to the pedal body urges the spring-biased elements out of engagement with the engagement edges, to release the cleat from the pedal.

11. A pedal/cleat assembly as defined in claim 10, wherein:
the spring clip includes two spaced-apart arms;
the two spring-biased elements are tongues carried on the two spaced-apart arms in spaced, facing relationship with each other; and
continued rotation of the cleat body relative to the pedal body, after the stop surfaces of the cleat body and the spring clip have engaged each other, urges the tongues of the spring clip apart from each other, to release the cleat from the pedal.

12. A pedal/cleat assembly as defined in claim 11, wherein:
the spring clip further includes a finger that projects radially outward from a mid-portion thereof, to define one of the two stop surfaces; and
the cleat body includes a recess sized to receive the finger of the spring clip, the recess being bounded by a sidewall that defines the other of the two stop surfaces.

13. A pedal/cleat assembly as defined in claim 12, wherein:
the cleat body further includes a pair of adjustable set screws that define sidewalls of the recess that receives the finger of the spring clip; and
the positions of the pair of adjustable set screws are selectively adjustable, to facilitate a selection of the angle through which the cleat can be rotated relative to the pedal body before the stop surfaces of the cleat body and the spring clip engage each other and thereby inhibit further rotation of the cleat body relative to the spring clip.

14. A pedal/cleat assembly as defined in claim 10, wherein the cleat further includes a friction device located between the cleat body and the spring clip, to frictionally inhibit rotational movement of the cleat body relative to the spring clip.

15. A pedal/cleat assembly as defined in claim 10, wherein:

the spring clip has a shape substantially corresponding to a circular arc, the circular arc having a geometric center point; and the spring clip is rotatable relative to the cleat body, about an axis substantially aligned with the geometric center point of the circular arc.

16. A pedal/cleat assembly as defined in claim 10, wherein:

the two engagement edges are recesses that each have side edges defining recess cam surfaces;

the two spring-biased elements are tongues that each have side edges that define tongue cam surfaces;

the recess cam surfaces and the tongue cam surfaces are configured such that rotation of the cleat relative to the pedal, after the stop surfaces of the cleat body and the spring clip have engaged each other, urges the tongues out of engagement with the engagement recesses, to release the cleat from the pedal.

17. A pedal/cleat assembly as defined in claim 16, wherein:

the recess cam surfaces are located at opposite ends of each of the engagement recesses, the recess cam surfaces having prescribed angles relative to a radius from the axis of rotation of the cleat body relative to the pedal body; and the tongue cam surfaces are located at opposite ends of each of the tongues, engageable with the recess cam surfaces of by the corresponding engagement recess, the tongue cam surfaces having prescribed angles relative to a radius from the axis of rotation of the cleat body relative to the pedal body.

18. A pedal/cleat assembly comprising:

a pedal including a pedal body and a spindle mounted for rotation relative to the pedal body; and a cleat including a cleat body configured to be secured to the sole of a rider's shoe and to conformably mate with the pedal body;

wherein the pedal and the cleat, together, further include one or more engagement edges located on one of the pedal body and the cleat body, and a spring assembly located on the other of the pedal body and the cleat body, the spring assembly including one or more spring-biased elements configured for selective engagement with the one or more engagement edges;

wherein the pedal and the cleat are configured such that, when the one or more spring-biased elements are engaged with the one or more engagement edges, the spring assembly is rotationally locked relative to the pedal body, such that rotation of the cleat body relative to the pedal body, about an axis normal to the sole of the rider's shoe, causes the spring assembly and the pedal body to rotate together, until a stop surface inhibits such rotation together;

and wherein the one or more engagement edges and the one or more spring-biased elements are configured such that further rotation of the cleat body relative to the pedal body urges the one or more spring-biased elements out of engagement with the one or more engagement edges, to release the cleat from the pedal.

19. A pedal/cleat assembly as defined in claim 18, wherein:

the one or more spring-biased elements of the spring assembly are part of the cleat; and the one or more engagement edges are part of the pedal and are fixed relative to the pedal body.

20. A pedal/cleat assembly as defined in claim 18, wherein:

the spring assembly is a unitary, arcuate spring clip having two spaced-apart arms;

the one or more spring-biased elements include two tongues carried on the two spaced-apart arms, in spaced, facing relationship with each other; and continued rotation of the cleat body relative to the pedal body, after the stop surfaces have inhibited further rotation together of the spring clip and the pedal body, urges the spring-biased tongues apart from each other, to release the cleat from the pedal.

21. A pedal/cleat assembly as defined in claim 18, wherein:

the pedal and the cleat, together, include two adjustable set screws that define stop surfaces for inhibiting rotation together of the pedal and the spring assembly; and the positions of the two adjustable set screws are selectively adjustable, to facilitate a selection of the angle through which the cleat body can be rotated relative to the pedal body before one of the stop surfaces inhibits further rotation together of the spring assembly and the pedal body.

22. A pedal/cleat assembly as defined in claim 18, wherein the one or more engagement edges and the one or more spring-biased elements each includes side edges that define cam surfaces configured to urge the one or more spring-biased elements out of engagement with the one or more engagement edges, to release the cleat from the pedal.

23. A pedal/cleat assembly as defined in claim 22, wherein:

the cam surfaces defined by each of the one or more engagement edges include first and second cam surfaces located at opposite ends of the engagement edge, the first and second cam surfaces having prescribed angles relative to a radius from the axis of rotation of the cleat body relative to the pedal body; and the cam surfaces defined by each of the one or more spring-biased elements include third and fourth cam surfaces located at opposite ends of the spring-biased element, engageable with the respective first and second cam surfaces defined by the corresponding engagement edge, the third and fourth cam surfaces having prescribed angles relative to a radius from the axis of rotation of the cleat body relative to the pedal body.

* * * * *